United States Patent Office 2,836,621
Patented May 27, 1958

2,836,621

STEROID INTERMEDIATES AND PROCESS

Virgil W. Gash and Bernard S. Wildi, Dayton, Ohio, assignors to Monsanto Chemical Company, St. Louis, Mo., a corporation of Delaware No Drawing. Application August 24, 1956
Serial No. 605,930

8 Claims. (Cl. 260—514.5)

The present invention is directed to certain novel carbocyclic tricyclic ketones which are useful as intermediates in the preparation of steroids. The invention is further directed to a method of preparing certain carbocyclic tricyclic keto-acids which are useful intermediates in the preparation of steroids.

In one aspect the invention is directed to carbocyclic tricyclic ketones having the 3-hydroxymethylene-8a-methyl-$\Delta^{9,10a(1)}$-octahydrophenanthrene-2-one nucleus,

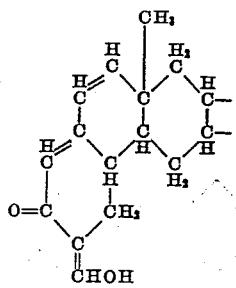

These compounds can also be designated as norhydroxymethylenetricyclic ketones, in the same manner as

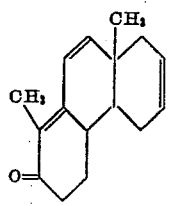

is for convenience designated herein as the tricyclic ketone.

Another group of novel and useful intermediates which can be prepared from the above norhydroxymethylenetricyclic ketones are the normethylanilinomethylenetricyclic ketones, which are carbocyclic tricyclic ketones having the 3-(N-methylanilino)-methylene - 8 a- methyl-$\Delta^{9,10a(1)}$-octahydrophenanthrene-2-one nucleus,

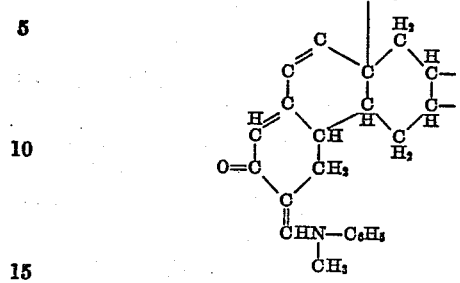

Another group of novel intermediates of the present invention are the carbocyclic tricyclic ketones having the 3 - (N-methylanilino)methylene-8a-methyl-dodecahydrophenanthrene nucleus,

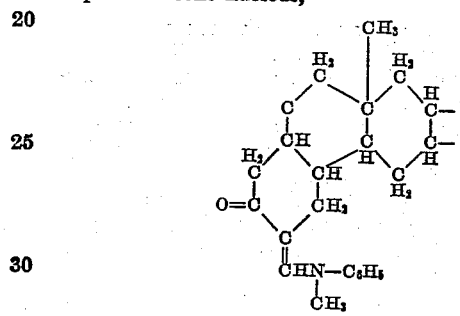

which can also be designated as normethylanilinomethylene-tetrahydrotricyclic ketones.

The above novel carbocyclic tricyclic ketones of the present invention are useful intermediates in synthesis of steroids. Woodward et al. in an excellent and comprehensive article, "Total Synthesis of Steroids," J. Am. Chem. Soc. 74, 4223–4251 (1952), describe a method of converting tricyclic ketones of the regular (methyl) series to active steroid compounds. By the use of the novel intermediates of the present invention, it is possible to carry out somewhat similar reactions in the normethyl series to prepare certain active 19-norsteroids. Woodward et al. describe much original work, and also refer to numerous literature references for some steps of their procedure. After the novel intermediates of the present invention are converted to carbocyclic tricyclic keto-acids by the method taught herein, they can then be converted to active steroid compounds by reactions closely paralleling the reactions taught in the Woodward et al. article or in the references there cited, and using the identical procedures taught therein.

As frequent reference to the above cited Woodward et al. article will be made herein, it will be understood that "Woodward et al." as used herein refers to the above cited J. Am. Chem. Soc. article, unless it is stated otherwise.

In the regular series of carbocyclic tricyclic ketones, the tricyclic keto-acids can readily be prepared by hydrogenating the tricyclic ketone to the dihydrotricyclic ketone, forming the hydroxymethylene dihydrotricyclic ketone, then the methylanilinodihydrotricyclic ketone, cyanoethylating, and finally forming the carboxyethyl derivative of the dihydrotricyclic ketone as represented below:

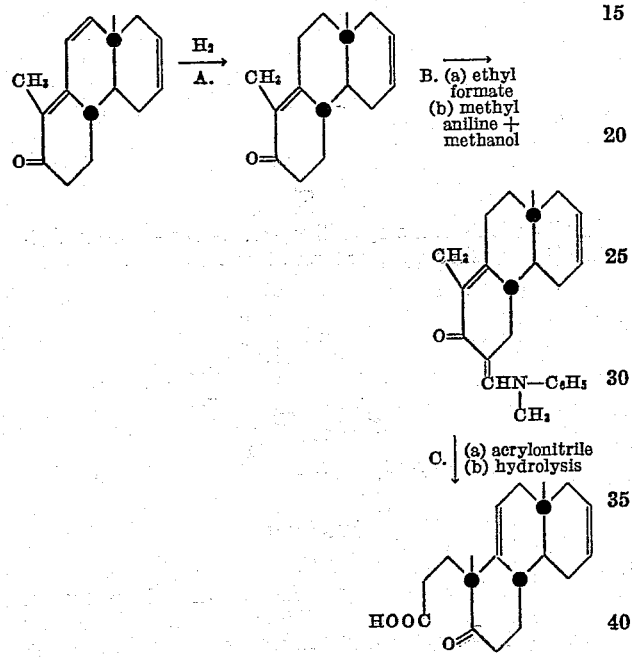

In the normethyl series, however, this procedure is unsuccessful. In the reaction corresponding to B, the yield of the methylanilino derivative is very poor, and the reaction corresponding to C produces a bis-carboxyethyl, rather than a mono-carboxyethyl derivative. However, when the tricyclic ketone is converted directly to the hydroxymethylene derivative and then to the methylanilino derivative, according to the outline of the methods of reaction in the chart below, the methylanilino derivative is produced in 81% yield, and this derivative can then be hydrogenated to the tetrahydro derivative and then converted to the carboxyethyl derivative, as set forth below. Thus, a novel and valuable route for the preparation of carbocyclic tricyclic keto-acids of the normethyl series is provided.

In the normethyl series, as in the normal series, it is essential that the 3-position of the carbocyclic tricyclic ketone be blocked prior to cyanoethylation. The (N-methylanilino)-methylene group is very satisfactory for this purpose.

The value of the above course of reactions in the normethyl series leading to the production of the (β-carboxyethyl) compound could not be predicted from the known reactions of the regular series; however, once the (β-carboxyethyl) compound is prepared, subsequent reactions in the normethyl series closely parallel the reactions in the regular series taught by Woodward et al.

The following chart provides an outline of the representative methods and compounds described herein. The reference numerals for the reactions refer to the various procedures set forth below. Compounds of this invention are represented by II, IIa, III, IIIa, IV and IVa. The novel method of this invention is represented by steps 1 to 4 (or 1a to 4a).

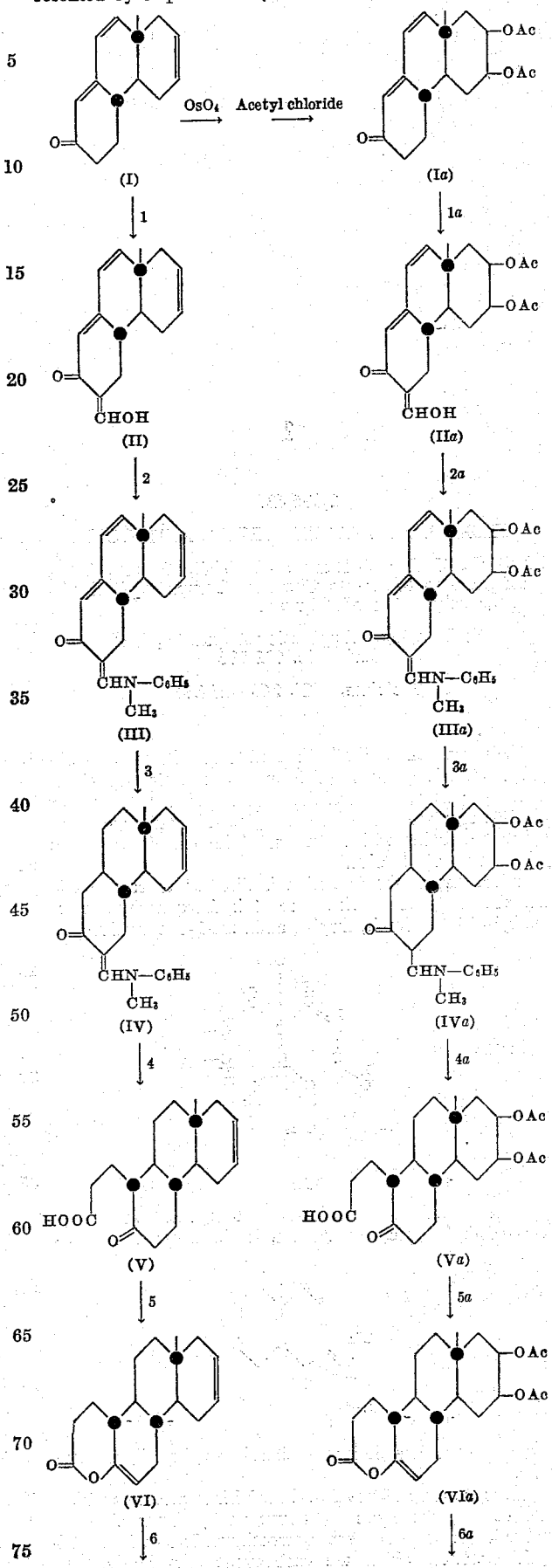

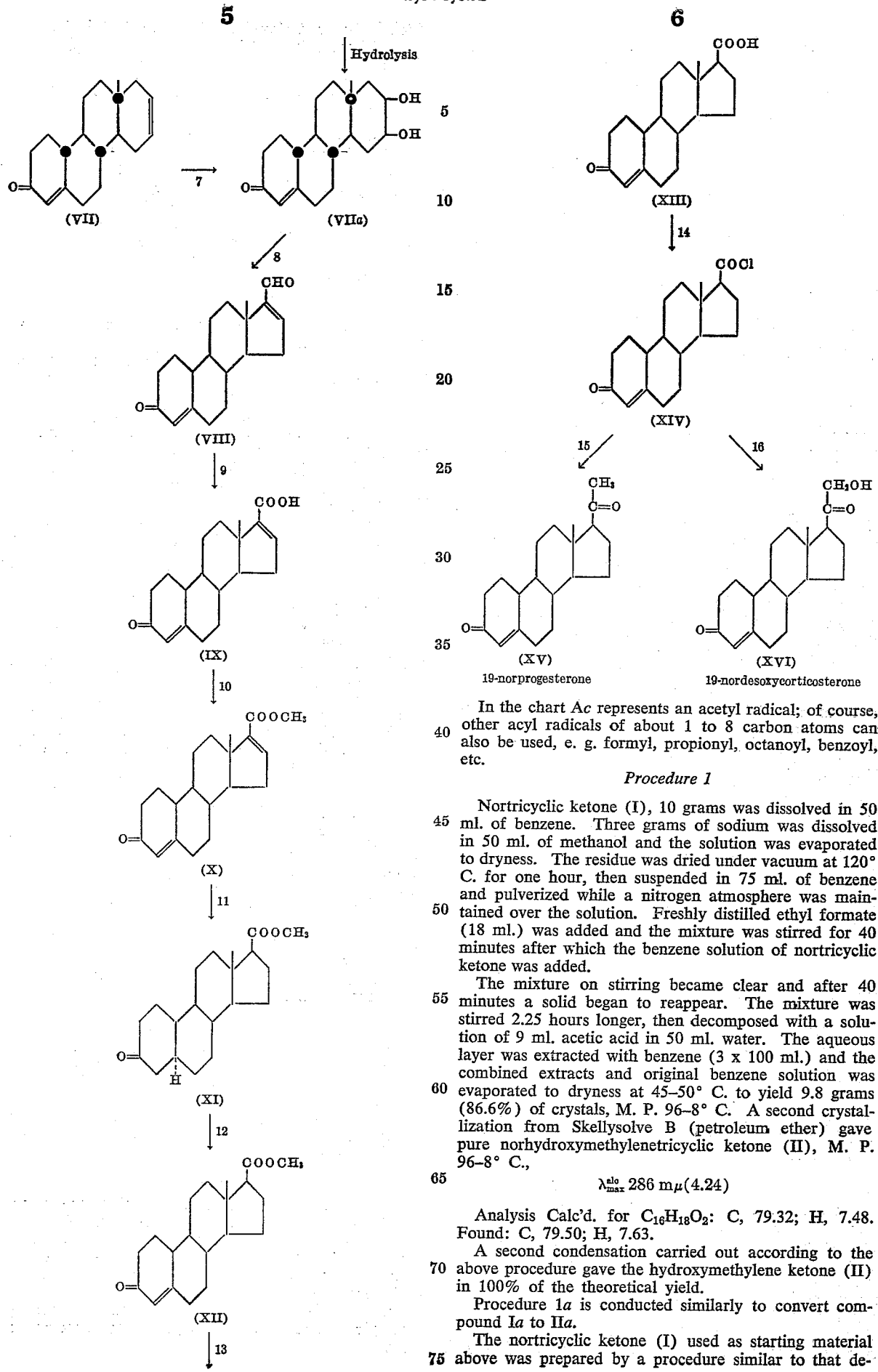

In the chart Ac represents an acetyl radical; of course, other acyl radicals of about 1 to 8 carbon atoms can also be used, e. g. formyl, propionyl, octanoyl, benzoyl, etc.

*Procedure 1*

Nortricyclic ketone (I), 10 grams was dissolved in 50 ml. of benzene. Three grams of sodium was dissolved in 50 ml. of methanol and the solution was evaporated to dryness. The residue was dried under vacuum at 120° C. for one hour, then suspended in 75 ml. of benzene and pulverized while a nitrogen atmosphere was maintained over the solution. Freshly distilled ethyl formate (18 ml.) was added and the mixture was stirred for 40 minutes after which the benzene solution of nortricyclic ketone was added.

The mixture on stirring became clear and after 40 minutes a solid began to reappear. The mixture was stirred 2.25 hours longer, then decomposed with a solution of 9 ml. acetic acid in 50 ml. water. The aqueous layer was extracted with benzene (3 x 100 ml.) and the combined extracts and original benzene solution was evaporated to dryness at 45–50° C. to yield 9.8 grams (86.6%) of crystals, M. P. 96–8° C. A second crystallization from Skellysolve B (petroleum ether) gave pure norhydroxymethylenetricyclic ketone (II), M. P. 96–8° C., $$\lambda_{max}^{alc} \ 286 \ m\mu (4.24)$$

Analysis Calc'd. for $C_{16}H_{18}O_2$: C, 79.32; H, 7.48. Found: C, 79.50; H, 7.63.

A second condensation carried out according to the above procedure gave the hydroxymethylene ketone (II) in 100% of the theoretical yield.

Procedure 1a is conducted similarly to convert compound Ia to IIa.

The nortricyclic ketone (I) used as starting material above was prepared by a procedure similar to that described in Patent No. 2,745,879 to R. B. Woodward for preparing the tricyclic ketone; in preparing the norticyclic ketone, methyl vinyl ketone rather than ethyl vinyl ketone was utilized, and the ketone adduct was treated with potassium hydroxide in acetone rather than dioxane. The norticyclic ketone is a solid, M. P. 99–102° C., $$\lambda_{max}^{alc} 279 \, m\mu$$

Procedure 2

A suspension of 9.4 grams of norhydroxymethylenetricyclic ketone (II) in 63 ml. of methanol was warmed until solution was complete and 11.6 ml. of N-methylaniline was added. The solution was stirred for 18 hours, then evaporated to a viscous oil at 7–10 mm. vacuum. The oil crystallized and was recrystallized from Skellysolve B to give 9.43 grams (74.4% of theory) of normethylanilinomethylenetricyclic ketone (III), M. P. 110–114° C. Further recrystallizations from ether gave pure material, M. P. 114–117° C., $$\lambda_{max}^{alc} 286 \, m\mu (3.95)$$

Analysis calc'd. for $C_{23}H_{25}NO$: C, 83.34; H, 7.60. C, 83.30; H, 7.89.

Procedure 2a is conducted similarly to convert IIa to IIIa.

Upon repeating Procedures 1 and 2 starting with 50 grams of nortricyclic ketone (I), the blocked ketone (III) was obtained in 81% yield.

When a similar series of reactions is conducted with the dihydrotricyclic ketone (8a-methyl-$\Delta^{6,10a(1)}$-decahydrophenanthrene-2-one), only a very poor yield of the normethylanilinomethylenedihydrotricyclic ketone, 3-(N-methylanilino)methylene-8a-methyl-$\Delta^{6,10a(1)}$-decahydrophenanthrene-2-one, is obtained and the compound is very difficult to crystallize.

Procedure 3

A mixture of 0.06 gram of 2% palladium on strontium carbonate catalyst (weight palladium/weight strontium carbonate) in 10 ml. of isopropyl alcohol was hydrogenated for 2 minutes, followed by addition of 0.05 ml. of 10% NaOH. A solution of 0.2442 gram of the normethylanilinomethylenetricyclic ketone (III) in 12 ml. of isopropyl alcohol was added and stirring was started. A total of 34 cc. of hydrogen (39 cc. theory for 2 double bonds) was absorbed in 53 minutes after which absorption ceased. The catalyst was filtered and the filtrate was acidified with one drop of acetic acid. The solvent was stripped from the filtrate, and the residue was dissolved in ether and washed with water. Upon removing the ether, the normethylanilinomethylenetetrahydrotricyclic ketone (I) was obtained as a pale yellow viscous oil. Upon removing the methylanilino blocking group for purposes of further identification (by aqueous acid followed by alkali), the nortetrahydrotricyclic ketone (8a-methyl-$\Delta^6$-dodecahydrophenanthrene-2-one) was obtained as an oil, 0.11 gram in amount. Infrared analysis showed saturated carbonyl absorption in the 5.88 m$\mu$ region and the absence of any $\alpha,\beta$-unsaturated carbonyl absorption; the compound appeared identical to nortetrahydrotricyclic ketone which had been obtained by adding 2 moles of hydrogen to nortricyclic ketone.

Procedure 3a is similarly conducted.

Procedure 4

The normethylanilinomethylenetetrahydrotricyclic ketone can be converted to the ($\beta$-carboxyethyl)nortetrahydrotricyclic ketone (V) by using the identical procedure taught in the Woodward et al. article, pages 4229 and 4244, for converting the acetonide of methylanilinomethylenedihydrotricyclic ketone to the carboxyethyl derivative of the acetonide of the dihydrotricyclic ketone. This procedure has also been used for converting the saturated Inhofen ketone to a cyanoethylated derivative which is then hydrolyzed to Windaus keto acid [Pinder and Robinson, Nature 167 484 (1951)] as represented below:

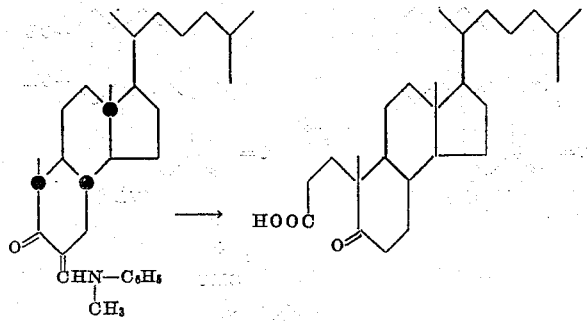

Windaus keto acid can readily be converted to the natural steroid, cholesterol.

The cyanoethylation of the normethylanilinomethylenetetrahydrotricyclic ketone (IV) is conducted by dissolving 80 grams of the compound in a hot mixture of benzene (1400 cc.) and t-butanol (1400 cc.). The solution is cooled to 50° C., freshly distilled acrylonitrile is added, and then a mixture of a 3.5% by weight solution of Triton B (benzyl trimethyl ammonium hydroxide) in t-butanol (140 cc.) and water (9.8 cc.) is added. The homogeneous reaction mixture is kept at 50° C. under a nitrogen mixture for 45 hours. The solvent is removed under water pump vacuum, and ether is added to the residue. The ether solution is evaporated from insolubles, which are washed with ether. Evaporation of the combined organic extracts leaves the crude acrylonitrile addition product.

The addition product is heated to boiling with a solution of potassium hydroxide (112 grams) in water (700 cc.) in a nitrogen atmosphere until evolution of ammonia ceases (about seven hours). The reaction mixture is cooled to room temperature and extracted with ether. The alkaline solution is then cooled to 0° C. in ice and carefully acidified with 2 N hydrochloric acid. The acidified solution is extracted several times with ether, and the combined organic layers are extracted several times with water. The dried ($MgSO_4$) ether extracts are evaporated and the residue is heated at 80° C. (1 mm.) for one hour to remove volatiles. The ($\beta$-carboxyethyl)-2-keto-8a-methyl-$\Delta^6$-dodecahydrophenanthrene will be obtained as a viscous syrup. The product can be separated into $\alpha$- and $\beta$-isomers by crystallization from a suitable solvent, such as ether.

In a similar procedure with the normethylanilinomethylene-dihydrotricyclic ketone, a dicarboxylic acid resulting from dicyanoethylation is obtained.

Procedure 4a is similarly conducted to prepare ($\beta$-carboxyethyl) - 2 - keto - 6,7 - dihydroxy - 8a - methyltetradecahydrophenanthrene.

Procedure 5

The $\beta$-keto-acid (V) above can be converted to the enol lactone (VI) by the procedure taught in the Woodward et al. article, pages 4230 and 4245, col. 2. This cyclization in the presence of sodium acetate and acetic anhydride is a well known procedure for converting keto acids to enol lactones (Turner, J. A. C. S. 72, 579 (1950)).

Procedure 5a is similarly conducted.

Procedure 6

By a Grignard reaction the above enol lactone is converted to 3-keto-$\Delta^{4,16}$-D-homoandrostadiene. This procedure is taught by Woodward et al., page 4246, col. 2, for the dl-3-keto-16,17-dihydroxy-$\Delta^{4,9(11)}$-D-homoandrostadiene acetonide, and the identical procedure is applicable here.

Procedure 6a is similarly conducted and followed by acid hydrolysis of the acetyl groups to prepare compound VIIa.

Procedure 7

Hydroxylation of VI to VIa can be accomplished by osmium tetroxide. This is a well known procedure for hydroxylating double bonds. For example, the procedure used by Woodward et al., pages 4241 to 4242, in converting the tricyclic ketone to the dihydroxy derivative is satisfactory.

Procedure 8

The homo-D-ring of ketone VIa is converted to a cyclopentano ring by opening and reclosing the ring: The ketone is oxidized, for example with $HIO_4$ to the dialdehyde, 1,2 - bis - (aldehydomethyl) - 2 - methyl - 7 - keto-$\Delta^8$-dodecahydrophenanthrene, which is then condensed to the 17-aldehyde steroid, 16-dehydro-19,21-bisnorprogesterone (VIII), by heating in an organic solvent in the presence of piperidine diacetate. This procedure can be carried out under the conditions taught by Woodward et al., pages 4231, col. 1, and 4247, col. 1. The aldehyde (VIII) can readily be converted into the 19-nor analogs of the natural steroid hormones of the adrenal cortex by known procedures. For example, the following procedures lead to 19-norprogesterone and 19-nordesoxycorticosterone, in the same manner as the procedures used by Woodward et al., pages 4231 and 4232, lead to progesterone and desoxycorticosterone.

Procedures 9 and 10

The aldehyde steroid (VIII) is oxidized by sodium dichromate in acetic acid to the corresponding acid, and then converted by diazomethane to methyl 19-nor-3-keto-$\Delta^{4,16}$-etiocholadienate (X). This conversion can be accomplished by the procedures of Woodward et al., 4247, col. 2.

Procedure 11

The etiocholadienate (X) is hydrogenated over reduced platinum oxide in acetic acid in order to reduce the $\Delta^{16}$ bond, the $\Delta^4$ bond being reduced at the same time. The hydrogenation is followed by oxidation with chromic acid in acetic acid to give methyl 19-nor-3-ketoetioallocholanate. The procedures of Woodward et al., page 4248, col. 2 can be used for this preparation.

Procedure 12

The $\Delta^4$ bond is regenerated by bromination and dehydrobromination of XI. The procedure of Rosenkranz et al., "A Method for the Conversion of Allo-Steroids into $\Delta^4$-3-Keto-Steroids," J. Am. Chem. Soc., 72, 1046 (1950), is satisfactory.

Procedure 13

The ester group is hydrolyzed by refluxing with potassium hydroxide, for example, by the procedure of Woodward et al., page 4249, col. 1.

Procedure 14

The acid XIII is converted to the acid chloride (XIV) by reaction of the sodium salt of the acid with oxalyl chloride. For this conversion of the 19-nor acid, the procedure used by Wilds et al. for the corresponding 3-keto-$\Delta^4$-etiocholenic acid, J. A. C. S. 70, 2427 (1948) is satisfactory.

Procedure 15

19-norprogesterone is prepared by alkylation of XIV with dimethyl cadmium, under the conditions used by Riegel et al., J. Org. Chem. 13, 933 (1948) in preparing progesterone.

19-norprogesterone has been reported to have 4-8 times the progestational activity of progesterone (W. Tullner and Roy Hertz Endocrinology, 52, 359–61 (1953) Chem. Abstracts 48, 2855), and is therefore very valuable for therapeutic purposes.

Procedure 16

By treating the acid chloride (XIV) with diazomethane, and adding the resulting diazoketone to boiling acetic acid, 19-nordesoxycorticosterone acetate can be obtained. Wilds et al., J. A. C. S. 70, 2427 (1948) teach the use of this procedure with the corresponding compounds of the normal series, and identical conditions are applicable here. The 19-nordesoxycorticosterone can readily be obtained by hydrolysis of the 19-nordesoxycorticosterone acetate.

While the $\beta$-keto acid from Procedure 4 was selected to illustrate the conversion to active steroids by the above procedures, it is apparent that the $\alpha$-isomer could be reacted similarly to prepare the corresponding 10-isosteroids.

It will be noted that the outline of the method of converting the normethyl tricyclic ketone to active steroids as described herein differs from the corresponding procedure used by Woodward et al. in that the $\Delta^6$ bond of the tricyclic ketone is not protected, or, optionally, is hydroxylated and esterified during the series of reactions in the preparation of the A-ring. However, if desired, the $\Delta^6$ bond can be hydroxylated and converted to the acetonide or other ketonide as in Woodward et al., prior to synthesis of the A-ring.

While there are described herein certain procedures embraced in our method of converting tricyclic ketones to the tricyclic keto acids, it will be appreciated that other art-recognized procedures for performing the individual steps of the method can be used, and that such is contemplated by the present invention.

The present specification describes certain procedures for converting our novel and useful intermediates to active steroid compounds. The intermediates are especially applicable to the preparation of 19-norprogesterone. Of course, the intermediates will also be useful in the preparation of other active steroids.

Procedures for converting our novel intermediate compounds to active steroids have been specifically described above with reference to some of our novel intermediates. Other examples of our novel intermediate compounds which are useful in such procedures are 3-(N-methylanilino)methylene - 6,7 - caproyloxy - 8a - methyltetradecahydrophenanthrene - 2 - one, 3 - (N - methylanilino)-methylene - 6,7 - dihydroxy - 8a - methyltetradecahydrophenanthrene - 2 - one acetonide, 3 - ( N - methylanilino)-methylene - 6,7 - dihydroxy - 8a - methyltetradecahydrophenanthrene-2-one cyclohexanonide, 3-(N-methylanilino)methylene - 6,7 - dihydroxy - 8a - methyltetradecahydrophenanthrene-2-one diethyl ketonide, 3-hydroxymethylene - 6,7 - dihydroxy - 8a - methyltetrahydrophenanthrene - 2 - one acetonide, 3 - hydroxymethylene - 6,7-dihydroxy - 8a - methyltetrahydrodecahydrophenanthrene-2 - one cyclohexanonide, 3 - hydroxymethylene - 6,7 - dihydroxy - 8a - methyl - tetradecahydrophenanthrene - 2-one diethyl ketonide, 3-(N-methylanilino)methylene-6,7-dihydroxy - 8a - methyl - $\Delta^{9,10a(1)}$ - decahydrophenanthrene - 2 - one acetonide, 3 - hydroxymethylene - 6,7-dihydroxy - 8a - methyl - $\Delta^{9,10a(1)}$ - decahydrophenanthrene-2-one acetonide, etc. Other ketonide derivatives are useful and contemplated by the present invention, particularly those prepared from lower aliphatic or cycloaliphatic ketones.

The normethyl carbocyclic tricyclic keto-acids produced by the herein-described method can be converted to active steroids in ways other than those described herein; for example Patent No. 2,745,879 to R. B. Woodward discloses procedures which can be used for converting the aforesaid keto acids to active steroids.

A method of converting certain normethyl carbocyclic tricyclic ketones to normethyl carbocyclic tricyclic keto-acids and novel intermediate compounds which are useful in this procedure have been described. Procedures for utilizing the normethyl carbocyclic keto-acids in the preparation of active 19-norsteroids have also been described.

We claim:

1. As compounds, the carbocyclic tricyclic ketones having the 3-hydroxymethylene-6,7-dihydroxy-8a-methyl-$\Delta^{9,10a(1)}$-octahydrophenanthrene-2-one structure,

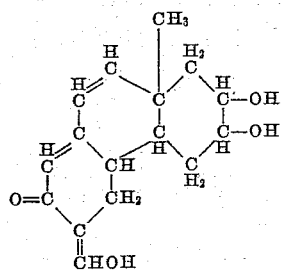

2. As compounds, the carbocyclic tricyclic ketones having the 3-(N-methylanilino)methylene-6,7-dihydroxy-8a-methyl-$\Delta^{9,10a(1)}$-octahydrophenanthrene-2-one structure,

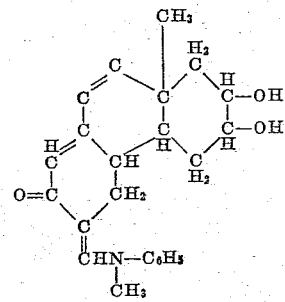

3. As compounds, the carbocyclic tricyclic ketones having the 3-(N-methylanilino)methylene-6,7-dihydroxy-8a-methyldodecahydrophenanthrene structure,

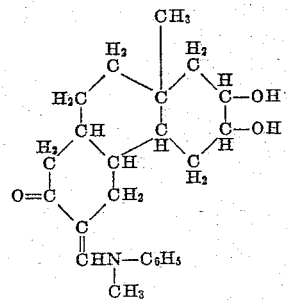

4. As a compound, 3-hydroxymethylene-8a-methyl-$\Delta^{6,9,10a(1)}$-octahydrophenanthrene-2-one.

5. As a compound, 3-(N-methylanilino)methylene-8a-methyl$\Delta^{6,9,10a(1)}$-octahydrophenanthrene-2-one.

6. As a compound, 3-(N-methylanilino)methylene-8a-methyl-$\Delta^6$-dodecahydrophenanthrene-2-one.

7. A method of preparing a carbocyclic keto acid which comprises formylating a tricyclic ketone having the 8a-methyl-2-keto-octahydrophenanthrene nucleus,

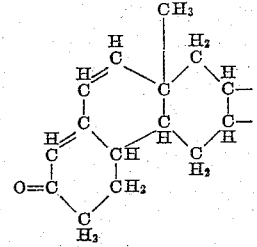

the incomplete structure at the 6,7 positions here and in the formulae below representing structure selected from the group consisting of a $\Delta^{6(7)}$ structure, acyloxy groups of 1 to 8 carbon atoms attached at each of the 6 and 7 positions, and a ketonide attached across the 6 and 7 positions, the said ketonide having 3 to 6 carbon atoms and being hydrocarbon except for the oxygen linkages to the 6 and 7 positions, in an organic solvent, converting the resulting 3-hydroxymethylene compound to a 3-(N-methylanilino)methylene compound by treatment with methylaniline, hydrogenating the latter compound over a hydrogenation catalyst to a 3-(N-methylanilino)methylene-8a-methyldodecahydrophenanthrene,

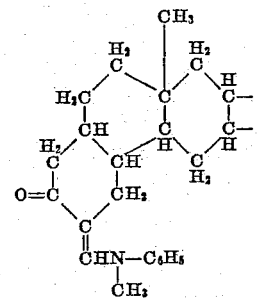

and cyanoethylating by treatment with acrylonitrile, and hydrolizing to give a carbocyclic tricyclic keto-acid having the 1-(beta-carboxyethyl)-8a-methyldodecahydrophenanthrene-2-one nucleus,

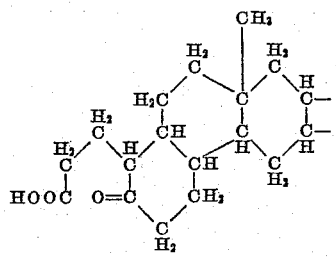

8. The method of preparing 1-(beta-carboxyethyl)-8a-methyl-$\Delta^6$-dodecahydrophenanthrene-2-one which comprises formylating 8a-methyl-$\Delta^{6,9,10a(1)}$-octahydrophenanthrene-2-one with ethyl formate and sodium methoxide in an organic solvent to obtain the 3-hydroxymethylene derivative thereof, treating said derivative with methylaniline in methanol solution to obtain the corresponding 3-(N-methylanilino)methylene derivative, then hydrogenating over palladium on strontium carbonate to cause 2 molar equivalents of hydrogen to be added to produce 3-(N-methylanilino)methylene-8a-methyl-$\Delta^6$-dodecahydrophenanthrene, then cyanoethylating by treating with acrylonitrile in t-butanol solution in the presence of benzyl trimethyl ammonium hydroxide, then hydrolyzing to 1(betacarboxyethyl)-8a-methyl-$\Delta^6$-dodecahydrophenanthrene-2-one.

References Cited in the file of this patent

UNITED STATES PATENTS

| | | |
|---|---|---|
| 2,760,966 | Knowles | Aug. 28, 1956 |
| 2,760,975 | Knowles | Aug. 28, 1956 |

UNITED STATES PATENT OFFICE

CERTIFICATE OF CORRECTION

Patent No. 2,836,621                                              May 27, 1958

Virgil W. Gash et al.

It is hereby certified that error appears in the printed specification of the above numbered patent requiring correction and that the said Letters Patent should read as corrected below.

Column 7, line 53, for "(I)" read -- (IV) --; column 10, line 72, after "carbocyclic" insert -- tricyclic --.

Signed and sealed this 20th day of January 1959.

(SEAL)

Attest:

KARL H. AXLINE                                           ROBERT C. WATSON

Attesting Officer                                     Commissioner of Patents